Oct. 22, 1968  D. C. NORTH, JR., ET AL  3,407,115
FUEL ELEMENT-CONTROL ROD ASSEMBLY
Filed Nov. 24, 1965  4 Sheets-Sheet 1

INVENTORS
Raymond M. Leirvik
Donald C. North, Jr.

ATTORNEY

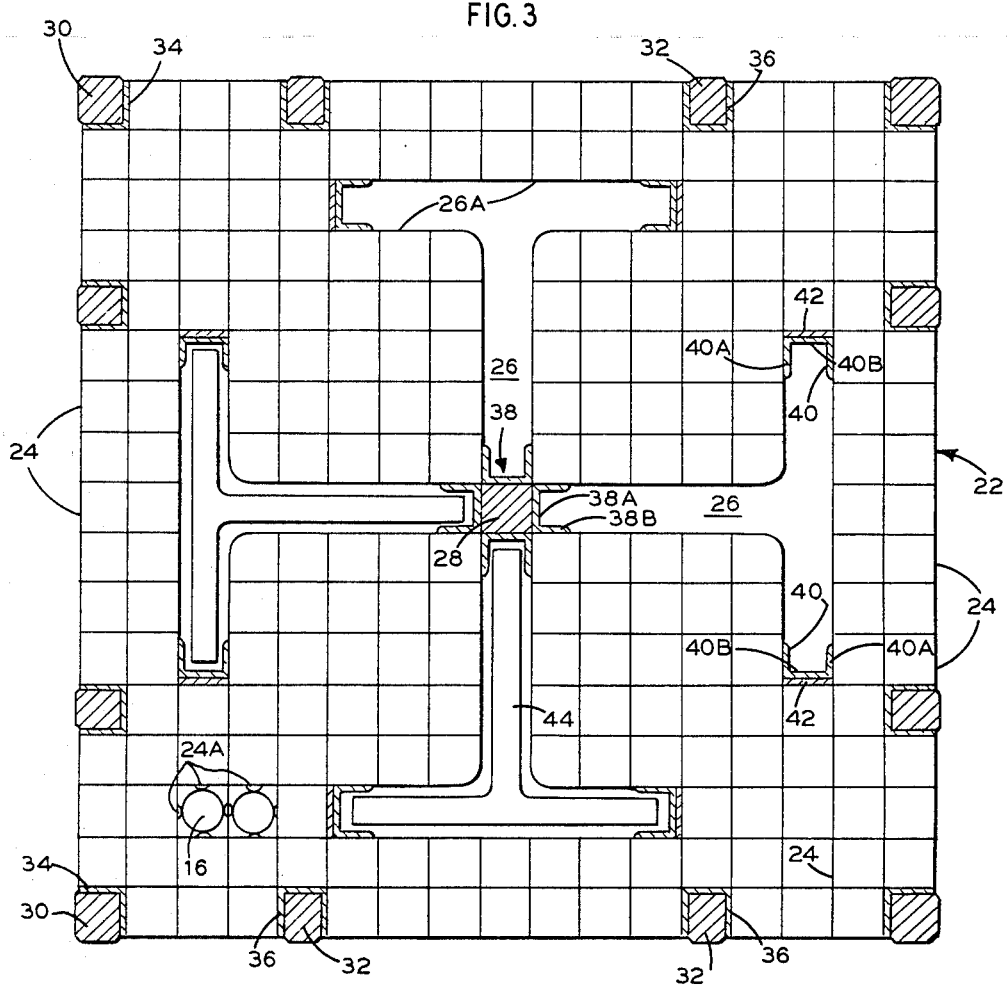

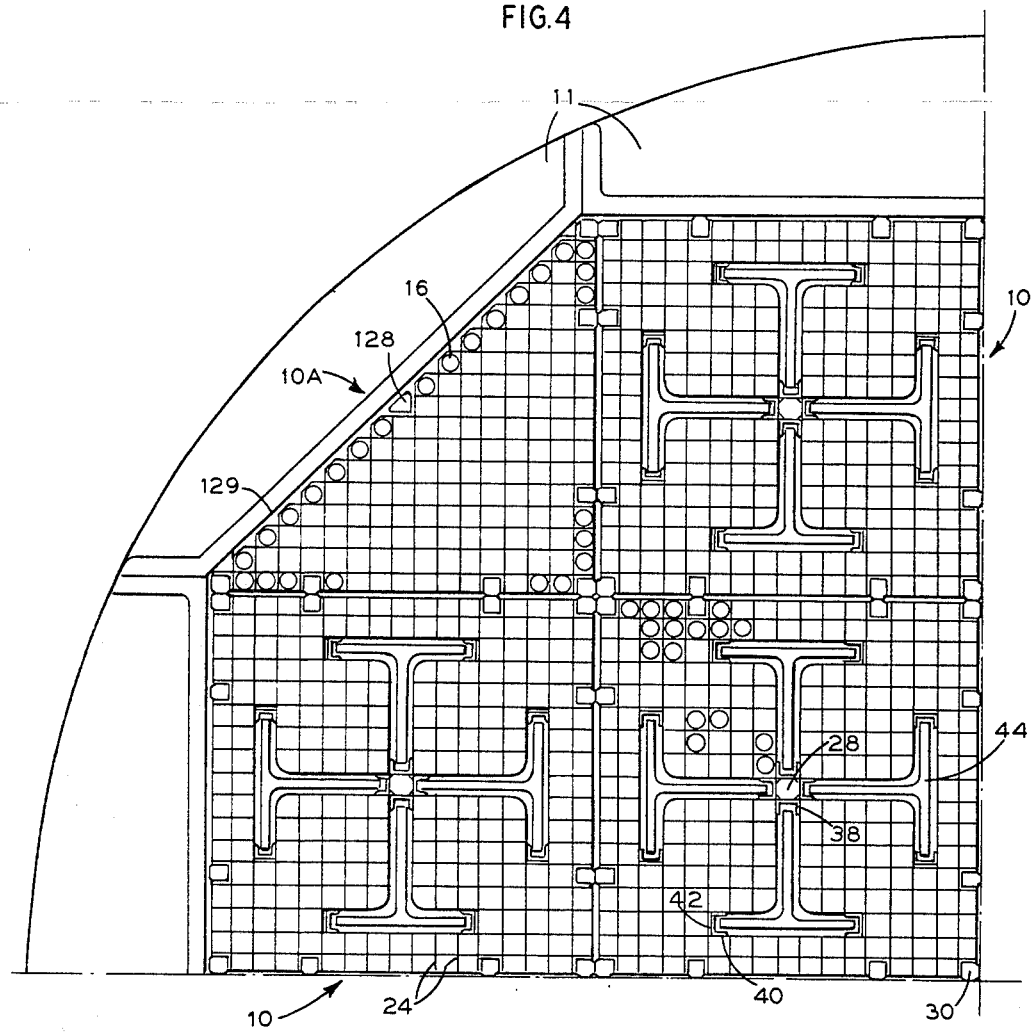

3,407,115
FUEL ELEMENT-CONTROL ROD ASSEMBLY
Donald C. North, Jr., and Raymond M. Leirvik, Lynchburg, Va., assignors to The Babcock & Wilcox Company, New York, N.Y., a corporation of New Jersey
Filed Nov. 24, 1965, Ser. No. 509,531
13 Claims. (Cl. 176—68)

ABSTRACT OF THE DISCLOSURE

A fuel element-control rod assembly comprising a bundle of fuel rods extending between and secured to a pair of grid plates, with spacer grids positioned between the grid plates and providing lateral support for the fuel rods. Structural rigidity for the assembly is provided by tie rods disposed about the periphery and in the central portion of the bundle of fuel rods. Four T-shaped control rod channels extend through the assembly about the center tie rod, with each channel being occupied by a control rod.

---

This invention relates in general to nuclear reactor fuel elements and more particularly to a combination fuel element-control rod assembly.

In nuclear reactors utilized for testing or for central power applications, the structural requirements for fuel elements depend upon the conditions within the reactor such as core height, coolant flow rates and the size and shape of the fuel components. In mobile reactors, however, such as those used for marine propulsion, the conditions external to the reactor resulting from the maneuverability of the vehicle greatly influence the fuel element structure. In marine reactors for example, in addition to the structure necessary to satisfy internal conditions, the fuel element must also withstand the effects of pitch and roll of the ship as well as ship maneuverability in docking, turning and the like.

Accordingly, the present invention is directed to a fuel element construction which affords the structural integrity required by conditions to be met in a mobile reactor.

A primary object of the invention is to provide adequate structural support for a fuel element arrangement employed in a mobile reactor.

Another object of the invention is to afford a more uniform distribution of the control rods across the transverse section of the fuel element.

Therefore, the present invention provides a combination fuel element-control rod assembly particularly adapted for use in a mobile reactor such as used in marine propulsion plants. The fuel element portion of the assembly comprises a bank of fuel rods extending between a pair of spaced grid plates which, in turn, are supported by end castings. Spacer grids formed of a plurality of spacer members are disposed between the end grid plates, providing lateral support for the fuel rods. Extending longitudinally through the center of the element is a tie rod secured at its opposite ends to the end grid plates. About the periphery of the element certain of the fuel rods are replaced by tie rods which are secured to the end fittings. Within the interior of the assembly some of the fuel rods and their spacer members are omitted to provide longitudinally extending control rod channels. A control rod set is located in each of these channels and the sets in each assembly are coupled together for unified movement through the channels.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Of the drawings:

FIG. 3 is an enlarged transverse sectional view of the assembly shown in FIG. 1; and FIG. 4 is a sectional view of one quadrant of a reactor core utilizing the assemblies shown in FIG. 1.

Reference is made to "A Glossary of Terms in Nuclear Science and Technology," ASME 110–1957, published by The American Society of Mechanical Engineers for a definition of the nuclear terms employed in the description of the invention.

Figure 1:
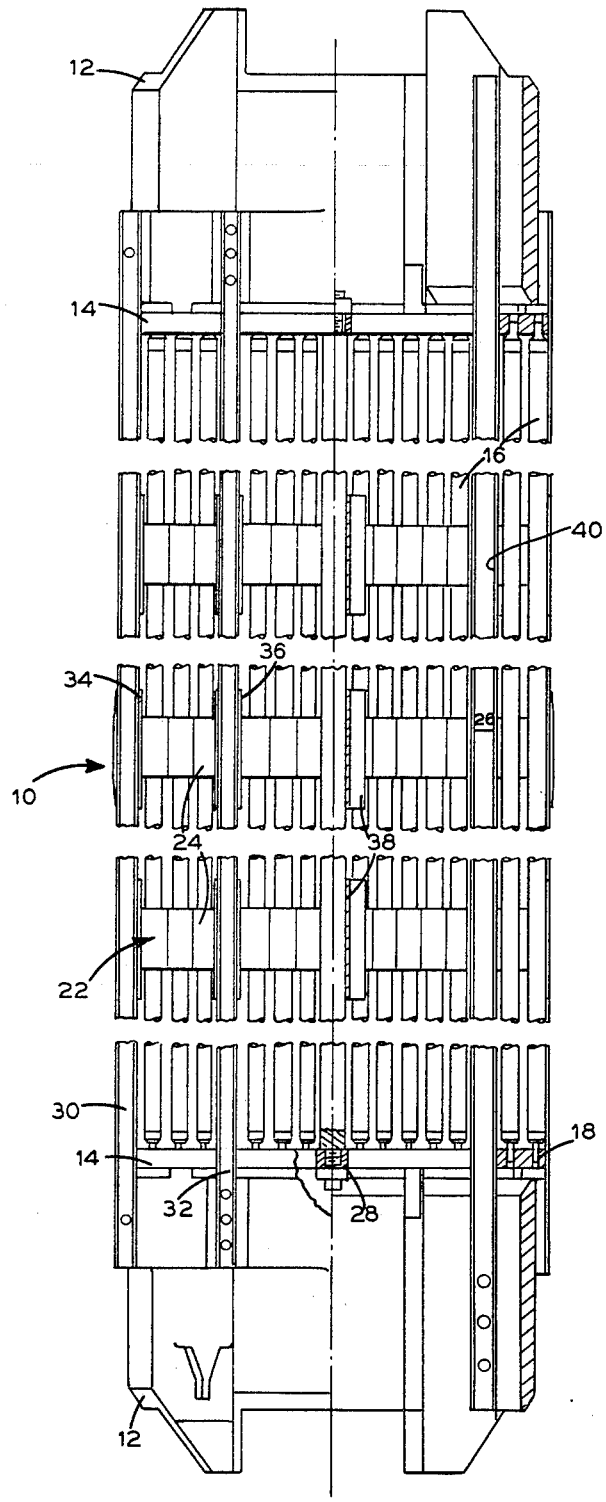
FIG. 1 is a side view partly in section of a fuel element-control rod assembly embodying the present invention.
Figure 2:
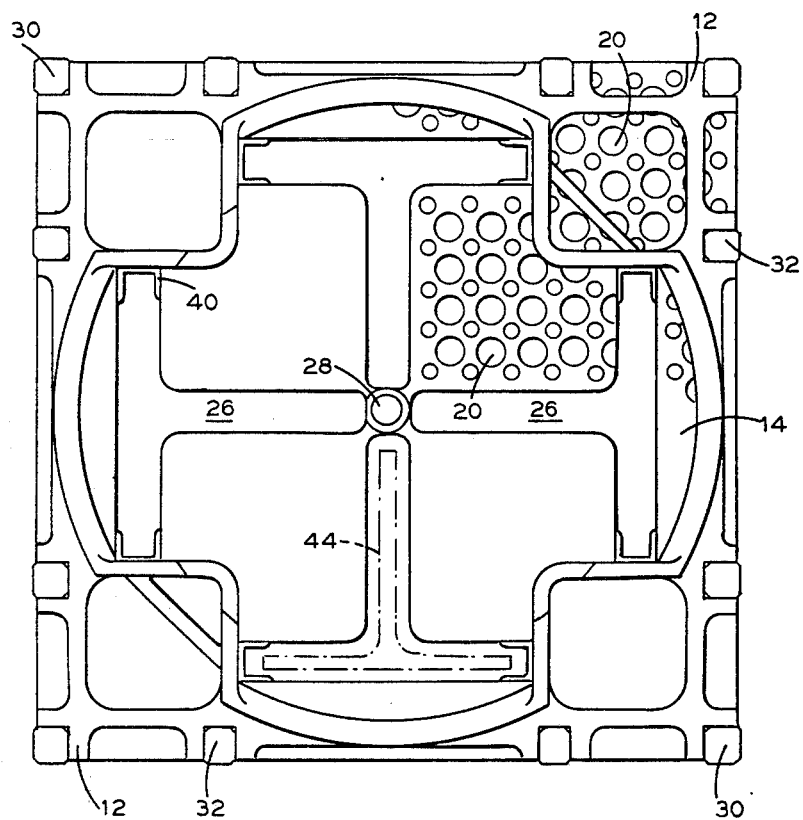
FIG. 2 is an enlarged end view of the assembly shown in FIG. 1.

In FIG. 1 there is shown a combination of fuel element-control rod assembly 10 while FIG. 4, though not in detail, illustrates the transverse arrangement of the assemblies in one quadrant of a reactor core. The quadrant is made up of three full size assemblies 10 and one-half size assembly 10A adapted to fit within the normally round configuration of the reactor vessel. Filler plates 11 are disposed outwardly of the assemblies extending to an enclosing vertical wall (not shown) to prevent bypassing of the coolant fluid around assemblies. A full size assembly 10 comprises a pair of spaced end fittings 12 each having an attached grid plate 14. Extending between the grid plates is a bundle of elongated fuel rods 16 arranged in a regular square lattice. The fuel rods 16 are secured into openings 18 in the grid plates and orifices or flow openings 20 are located in the grid plates between the fuel rod openings for the passage of coolant through the assembly, see FIG. 2 which shows some of these openings and orifices.

Spacer grids 22, made up of relatively short square tubular spacer sections 24 integrally attached together in side-by-side relationship, are located at spaced locations between the grid plates. In FIG. 3 a spacer grid is shown with most of the fuel rods left out. The spacer sections 24 secure the fuel rods against lateral motion while permitting longitudinal movement. For a typical spacer section which could be employed in the spacer grid, reference is made to copending application Ser. No. 219,043, filed Aug. 23, 1962, now Patent No. 3,255,090. In FIG. 3 several tubular spacer sections are shown with the sides 24A of the sections recessed inwardly into contact with the fuel rods providing the required lateral support for the rods. Control rod channels 26 extend through the assembly 12 and are formed through the spacer grids 22 by eliminating certain of the tubular spacer sections 24.

Structural rigidity for the assembly is provided by a number of tie rods extending between the end support means of the assembly. Located along the longitudinal center of the assembly and replacing a fuel rod and its associated spacer members is center tie rod 28. As illustrated in FIG. 1 the tie rod 28 has the same transverse dimensions as the tubular sections 24 and is secured at its ends into the upper and lower grid plates 14. The remaining tie rods in each assembly are located about the periphery of the combination assembly 10. At each corner the tie rods 30 extend between and are secured to the end castings 12. Intermediate the corner tie rods on each of the four sides of the spacer grid 22 are pairs of tie rods 32 located at approximately the quarter points and secured to the end castings. The peripheral tie rods replace a corresponding number of fuel rods and their spacer members.

In the spacer grid 22, support members are provided for securing the peripheral tie rods 30, 32 to the grid because the rods are smaller than the grid openings. The corner tie rods 30 have angle shaped support members 34 while the intermediate tie rods 32 have channel shaped support members 36. It will be noted in FIGS. 2 and 3 that the peripheral tie rods extend transversely a short distance beyond the outer edge of the spacer grids at midspan so that the tie rods of adjoining assemblies abut while the outside surfaces of adjoining spacer grids are slightly separated from another. This arrangement reduces fuel element assembly movement during mobile operation. The outer corners of the peripheral tie rods are chamfered to avoid binding of the rods and to facilitate removal of the individual assemblies 10.

Within the assembly the center tie rod 28 serves as the hub from which the four control rod channels 26 radiate. In the spacer grid short channel shaped members 38 are secured along their webs 38A, one to each of the sides of the center tie rod with the outstanding legs 38B extending outwardly. Channel shaped members 38 form the base of the control rod channels 26 in the region of the spacer grid. At the opposite ends of the head portion 26A of the T-shaped channels channel members 40 extend through the assembly attached along their legs 40A to the adjoining tubular sections of the grid and along their webs 40B to a flat plate filler section 42 which in turn is secured to the tubular sections it adjoins. The channel members 40 are secured at their ends to the end castings 12 and provide incidental structural support for the assembly 10. These channel shaped members 38, 40 define the three ends of the T-shaped control rod channels 26 within the spacer grid.

In FIG. 3, T-shaped control rods 44 are shown in two of the channels 26, while in FIG. 4 they are shown in all four of the channels of one assembly as they would appear when completely assembled. Though not illustrated it is to be understood that a complete control rod set also includes a control section, a follower section, an extension section, and a drive coupling. The control rod set is disposed in the channel so that either the control or follower section is within the channel 26 during operation. Within each assembly all the control rods depend from a common support so that they can be moved as a unit.

Ordinarily in fuel element assemblies with interior control rod channels the channel is cruciform in shape and extends centrally through the assembly. Accordingly, it is difficult to provide any centrally disposed support means for the fuel element since that portion of the assembly is taken up by the control rod. In the present invention the control rods are distributed more uniformly across the transverse section of the assembly and it leaves the center of the assembly open to receive the tie rod support. Additionally, since the control rods are positioned outwardly from the center of the assembly within each of its quadrants they provide a more uniform control effect throughout the reactor core.

The general construction of the half size assemblies 10A is similar to that of the full size ones except they contain no control rod channels, though such channels could be provided if required, and the tie rod 128 comparable to center tie rod 28 is located not centrally but mid-way along the diagonally extending side 129.

In stationary power reactors the fuel elements are not exposed to the stresses developed in a mobile power reactor. In a mobile reactor the fuel element must be able to withstand not only the vibrations and stresses set up by the flow of the coolant through the core but also the stresses induced by the exterior conditions affecting the reactors and the maneuvering operations of its vehicle. The present invention provides the necessary structural support to meet such conditions.

While in accordance with the provisions of the statutes there is illustrated and described herein a specific embodiment of the invention, those skilled in the art will understand that changes which may be made in the form of the invention may sometimes be used to advantage without a corresponding use of the other features.

What is claimed is:

1. A nuclear fuel element-control rod assembly comprising:
   (A) support means at each end of said assembly,
   (B) a bundle of longitudinally extending fuel rods spaced in a regular lattice extending between said support means,
   (C) at least one spacer grid positioned intermediate the ends of said fuel rods for laterally supporting said fuel rods, said spacer grid comprising a plurality of short multisided tubular sections integrally attached together in side-by-side relationship to form a unitary structure,
   (D) tie rod means disposed interiorly within and extending through said bundle of fuel rods and secured to said support means,
   (E) exterior tie rods disposed in spaced positions about the periphery of and extending through said bundle of fuel rods and secured to said support means,
   (F) a plurality of control rod channels extending longitudinally through said assembly, and
   (G) a control rod disposed in each of said channels.

2. A nuclear fuel element-control rod assembly as set forth in claim 1 wherein said tubular sections have a square shape in transverse section and the sides thereof are indented inwardly for providing lateral support for said fuel rods.

3. A nuclear fuel element-control rod assembly as set forth in claim 1 wherein said tubular sections are omitted in selected regions in said grid to afford a number of control rod channel openings through said grid.

4. A nuclear fuel element-control rod assembly as set forth in claim 3 wherein said interiorly disposed tie rod means comprises a longitudinally extending rod centrally located within said bundle of fuel rods and attached at its ends to said support means.

5. A nuclear fuel element-control rod assembly as set forth in claim 4 wherein said tie rod means comprises a rod having the same cross sectional shape as one of said tubular sections and replaces the one of said tubular sections at the center of said spacer grid.

6. A nuclear fuel element-control rod assembly as set forth in claim 5 wherein said control rod channels extend radially outward from said tie rod means and are equiangularly spaced apart.

7. A nuclear fuel element-control rod assembly as set forth in claim 6 wherein first control rod guide members are located in said control rod channels attached to said tie rod means and the adjoining said tubular sections and second control rod guide members are disposed in the outer ends of said channels secured to the adjoining said tubular sections.

8. A nuclear fuel element-control rod assembly as set forth in claim 7 wherein said control rod channels are T-shaped with the leg of the T extending radially outward from the centrally located tie rod means and the head of the T disposed inwardly from the exterior tie rods.

9. A nuclear fuel element-control rod assembly as set forth in claim 8 wherein the legs of said control rod channels are angularly disposed 90 degrees apart.

10. A nuclear fuel element-control rod assembly as set forth in claim 1 wherein said bundle of fuel rods is rectangular in transverse cross-section and said exterior tie rods comprise a rod located at each corner of said bank and at least one rod located intermediate said corner rods along each side of said bundle.

11. A nuclear fuel element-control rod assembly as set forth in claim 10 wherein support sections are secured to the tubular sections of said space grid and to said exterior tie rods.

12. A nuclear fuel element-control rod assembly comprising:
   (A) support means at each end of said assembly, (B) a bundle of longitudinally extending fuel rods spaced in a regular lattice extending between said support means, (C) at least one spacer grid positioned intermediate the ends of said fuel rods for laterally supporting said fuel rods, said spacer grid comprising a plurality of multisided tubular sections attached together in side-by-side relationship to form a unitary structure, (D) tie rod means extending between and secured to said support means and including a tie rod centrally located within said bundle of fuel rods, (E) a plurality of T-shaped control rod channels disposed about said central tie rod and extending longitudinally through said assembly, and (F) a T-shaped control rod disposed in each of said channels.

13. A longitudinally extending nuclear fuel element-control rod assembly comprising:

(A) an end casting at each end of said assembly, (B) a grid plate supported by each of said castings, (C) a bundle of longitudinally elongated fuel rods extending between and attached to said grid plates, (D) at least one fuel rod spacer grid positioned intermediate the ends of said fuel rods, (E) said spacer grid comprising a plurality of relatively short square tubular spacer sections integrally attached together in side-by-side relationship for laterally supporting said fuel rods, (F) a longitudinally arranged tie rod extending centrally through said bank of fuel rods and secured to the grid plates at the opposite ends of said assembly, (G) longitudinally extending exterior tie rods located at the corners and in spaced positions intermediate the corners about the periphery of said bank of fuel rods, said exterior rods secured to said end castings, (H) support sections attached to said spacer grid and said exterior tie rods, (I) four T-shaped control rod channels extending longitudinally through said assembly, the legs of said T extending radially outward from said centrally arranged tie rod and spaced 90 degrees apart and the head of the T being located remote from the center of the bank of fuel rods, selected tubular sections omitted from said spacer grid for providing continuation of said channels through said spacer grid, and (J) T-shaped control rods positioned in each of said channels and interconnected for uniform withdrawal from and insertion into said channel.

References Cited

UNITED STATES PATENTS

| | | | |
|---|---|---|---|
| 3,144,393 | 8/1964 | Raber et al. | 176—86 X |
| 3,194,743 | 7/1965 | Deddens et al. | 176—86 X |
| 3,211,623 | 10/1965 | Tower | 176—76 X |
| 3,238,109 | 3/1966 | Kent et al. | 176—60 X |

FOREIGN PATENTS 977,544   9/1964   Great Britain.

REUBEN EPSTEIN, *Primary Examiner.*